Sept. 11, 1962  D. L. KOUBA ET AL  3,053,908
PREPARATION OF NITRATED TOLUENE
Original Filed Feb. 25, 1957
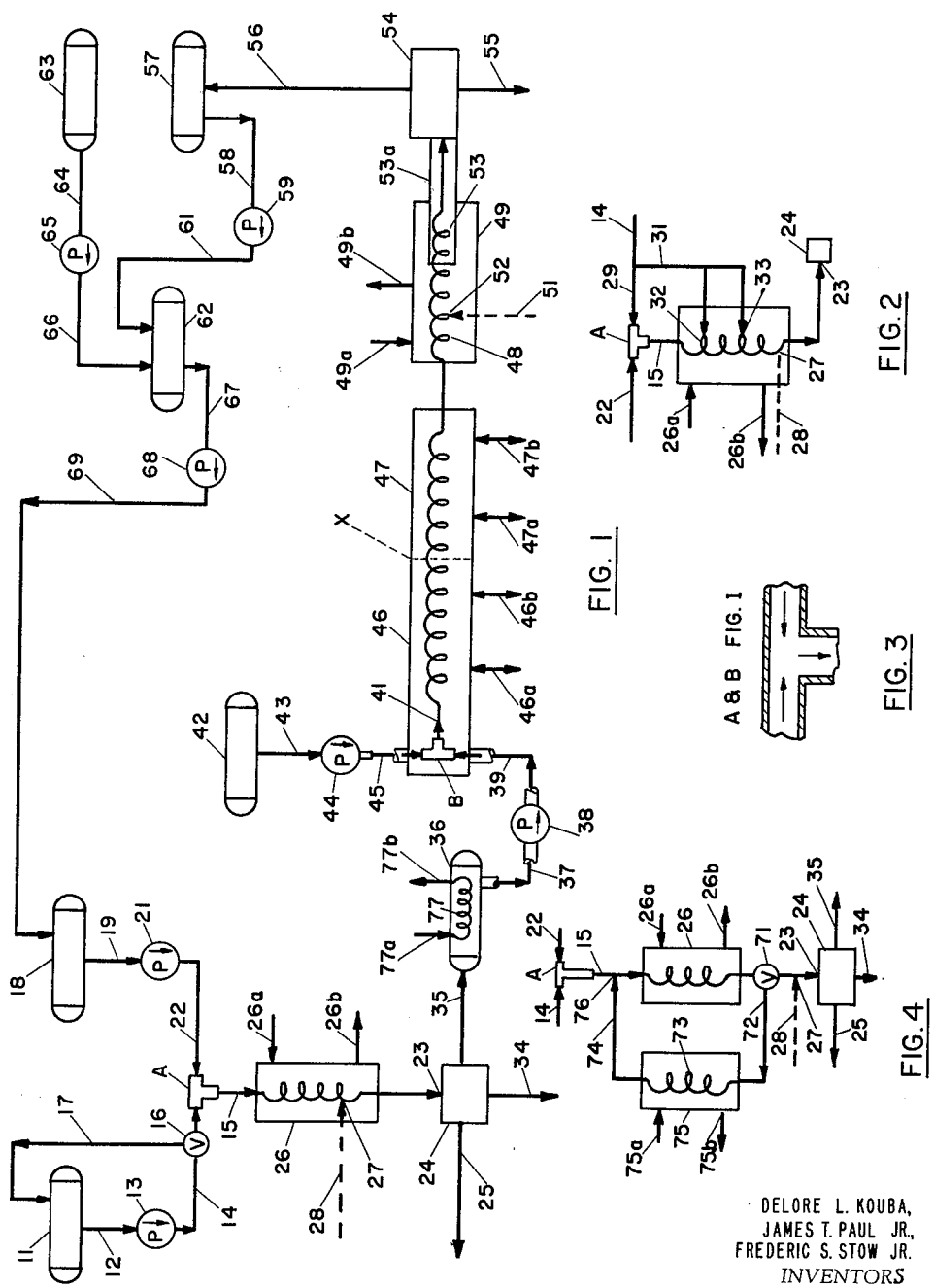
DELORE L. KOUBA,
JAMES T. PAUL JR.,
FREDERIC S. STOW JR.
INVENTORS
BY  Ernest G. Peterson
AGENT.

United States Patent Office 3,053,908
Patented Sept. 11, 1962

3,053,908
PREPARATION OF NITRATED TOLUENE
Delore L. Kouba, James T. Paul, Jr., and Frederic S. Stow, Jr., Wilmington, Del., assignors to Hercules Powder Company, Wilmington, Del., a corporation of Delaware
Original application Feb. 25, 1957, Ser. No. 642,147. Divided and this application Oct. 28, 1959, Ser. No. 849,367
6 Claims. (Cl. 260—645)

This invention relates to novel tubular nitration procedures and apparatus for nitration of toluene. More particularly, this invention relates to novel tubular nitration procedures and apparatus by which toluene is nitrated in two stages to form trinitrotoluene. In the first stage of nitration according to this invention, toluene is partially nitrated to an average nitrogen content between about 14.5% and about 16.5%, and in the second stage of nitration partially nitrated toluene having a nitrogen content between about 14.5% and about 16.5% is further nitrated to form trinitrotoluene.

It is well-known, of course, that toluene is a material which nitrates in stages corresponding generally to mononitrotoluene, dinitrotoluene, and finally trinitrotoluene, and numerous multistage nitration processes have been proposed for the manufacture of trinitrotoluene. In substantially all of these prior art processes, the operation is really a modified batch process in that high hold-up vessel-type nitrators are employed. Moreover, extensive circulation, recirculation, and a relatively long residence time of the reaction mixture in the nitrating zone are characteristics of a majority of the previously proposed methods, and such features are inherently undesirable because they favor degradative side reactions. Such degradative side reactions occur in prior art processes in all stages of the nitration of toluene to trinitrotoluene, particularly in the final stage.

It is a primary object of the present invention, therefore, to provide novel and unique tubular nitration procedures and apparatus which overcome the above-noted characteristic faults of prior art methods.

A further object of the present invention is to provide an improved two-stage nitration process and apparatus for manufacture of trinitrotoluene from toluene.

Another object is to provide improved nitration procedures and apparatus in which there is a minimum amount of nitrated toluene product in process at any time.

Still other objects of this invention include:

Provision of improved nitration procedures which are much more rapid and in which there is a minimum of side reactions encountered in comparison to prior art methods of nitration.

Provision of improved nitration procedures and apparatus which are unique in their simplicity in comparison to prior art methods.

Provision of improved nitration procedures and apparatus wherein positive control of the process is easily and readily accomplished.

Provision of improved nitration procedures and apparatus which require only simple, relatively inexpensive equipment and buildings in comparison to prior art methods.

Other objects will become apparent from the following description of the invention, the novel features and combinations being set forth in the appended claims.

Generally described, these objectives and others are accomplished by continuously feeding a stream of reactant material selected from the group consisting of toluene and partially nitrated toluene having an average nitrogen content between about 14.5% and about 16.5% by weight and mixtures thereof through a tubular path to a tubular reaction zone, simultaneously and continuously feeding a stream of nitrating acid through a second tubular path to said tubular reaction zone, impinging the separate streams of reactant material and nitrating acid upon each other in said tubular reaction zone to form a reaction mixture stream in the tubular reaction zone, continuously advancing said reaction mixture stream through said tubular reaction zone to form a reaction product containing nitrated toluene having a higher nitrogen content than the original reactant material.

More particularly, the above objectives and others are accomplished in accordance with this invention by (a) continuously feeding a stream of toluene through a tubular path to a tubular reaction zone, (b) simultaneously and continuously feeding a stream of nitrating acid containing between about 60% and about 85% sulfuric acid, between about 10% and about 30% nitric acid, and between about 3% and about 16% water by weight on a contaminant free basis through a second tubular path to said tubular reaction zone, (c) impinging the separate streams of toluene and nitrating acid upon each other to form a reaction mixture stream in the tubular reaction zone, (d) continuously advancing the resultant reaction mixture stream through the tubular reaction zone while regulating the temperature of said reaction mixture stream between about 40° C. and about 140° C. until the toluene has been partially nitrated to an average nitrogen content between about 14.5% and about 16.5% by weight, and (e) continuously discharging the reaction mixture stream into a separating zone and there separating spent nitrating acid from partially nitrated toluene having an average nitrogen content between about 14.5% and about 16.5% by weight. The above combination of process steps (a) to (e), inclusive, constitutes the first stage of nitration in accordance with this invention. The partially nitrated toluene product obtained in the first stage of nitration is composed substantially of dinitrotoluene, with relatively minor amounts of mononitrotoluene and trinitrotoluene. It is quite similar in composition to the product heretofore known in the art as "Bi-Oil," employed as an explosive ingredient in various high explosive formulas, and has been found to be a satisfactory equivalent to Bi-Oil as a high explosive ingredient. In accordance with one embodiment of this invention, therefore, the partially nitrated toluene product which is separated from spent nitrating acid in step (e) of the first stage of nitration may then be purified by conventional methods and the purified product employed as an equivalent to commercial Bi-Oil, as for example, an explosive ingredient in high explosive formulas.

However, for trinitrotoluene manufacture, the partially nitrated toluene product from step (e) of the first stage of nitration is then subjected to a second stage of nitration by (f) continuously feeding a stream of the separated partially nitrated toluene product from step (e) at a temperature above its melting point and under pressure through a tubular path to a high temperature tubular reaction zone maintained at a temperature between about 90° C. and about 140 C., (g) simultaneously and continuously feeding a stream of trinitration acid under pressure through a second tubular path to said high temperature tubular reaction zone, (h) impinging the separate streams of molten partially nitrated toluene product and trinitration acid upon each other under pressure to form a reaction mixture stream in the high temperature tubular reaction zone, (i) continuously advancing the resultant reaction mixture stream under pressure through the high temperature tubular reaction zone until substantially all of the partially nitrated toluene product has been nitrated to trinitrotoluene, (j) continuously advancing the reaction mixture stream under pressure through a tubular cooling zone to cool said reaction mixture below about 100° C. and above the freezing point of said reaction mixture and (k) thereafter separating trinitrotoluene from spent trinitration acid, the pressure in step (i) being sufficient to prevent any substantial vaporization of nitric acid during the nitration reaction.

The combination of steps (f) to (k), inclusive, constitutes the second stage of nitration, and may be practiced independently for the continuous manufacture of trinitrotoluene from dinitrotoluene prepared by any method, or from commercial Bi-Oil. The combination of steps (a) to (k), inclusive, constitutes a continuous two-stage process for the manufacture of trinitrotoluene from toluene.

In one embodiment of the invention, it has been found desirable in the first stage of nitration to (a) continuously feed a stream of toluene through a divided tubular path to a tubular reaction zone, (b) simultaneously and continuously feed a stream of nitrating acid containing between about 60% and about 85% sulfuric acid, between about 10% and about 30% nitric acid, and between about 3% and about 16% water by weight on a contaminant free basis through a second tubular path to said tubular reaction zone, (c) impinging the stream of nitrating acid and one branch of the divided stream of toluene upon each other to form a reaction mixture stream in the tubular reaction zone, and (d) thereafter injecting the remainder of the divided stream of toluene into the reaction mixture stream in the tubular reaction zone. Greatly improved control of the reaction in the first stage of nitration is achieved by dividing the toluene feed and injecting the divided stream at two or more points along the tubular reaction zone.

An alternate method for achieving improved control of the first-stage nitration embodies continuously recycling part of the reaction mixture stream, upon substantial completion of the first-stage nitration reaction, through a tubular cooling zone and injecting the cooled stream into the main reaction mixture stream in the initial part of the tubular reaction zone.

It has also been found desirable in practicing the second stage of nitration to maintain an initial part or portion of the high temperature tubular reaction zone adjacent to the converging feed streams of molten partially nitrated toluene and trinitration acid at a temperature between about 90° C. and about 120° C., and the remainder of the high temperature tubular reaction zone at a higher temperature than said initial part and between about 110° C. and about 140° C. This promotes better control of the second-stage nitration. Preferably, but not necessarily, the reaction mixture streams in both the first- and second-stage nitrations are advanced through their respective tubular reaction zones at flow rates corresponding to a Reynold's number of at least about 2100 and sufficient to maintain turbulent flow in the reaction mixtures.

In a preferred embodiment of the invention, spent trinitration acid, after separation from trinitrotoluene, is recovered and adjusted in composition by adding aqueous nitric acid thereto to form a nitrating acid containing between about 60% and about 85% sulfuric acid, between about 10% and about 30% nitric acid, and between about 3% and about 16% water by weight on a contaminant free basis and then recycling the adjusted acid composition as nitrating acid to the first-stage nitration.

Improved apparatus for practicing nitration of toluene in two stages in accordance with this invention comprises in combination an elongated first-stage tubular reactor having a communicating toluene feed tube and a communicating first-stage nitrating acid feed tube, said feed tubes converging and junctioning with said first-stage tubular reactor at one end thereof, said toluene feed tube communicating with a toluene supply source and having means associated therewith for feeding a stream of toluene at predetermined flow rate through said toluene feed tube to the first-stage tubular reactor, said first-stage nitrating acid feed tube communicating with a first-stage nitrating acid supply source and having means associated therewith for feeding a stream of first-stage nitrating acid at predetermined flow rate through said first-stage nitrating acid feed tube to the first-stage tubular reactor, means associated with the first-stage tubular reactor to control and regulate the temperature of the first-stage reaction mixture therein between about 40° C. and about 140° C., a first-stage separator disposed to receive the first-stage reaction mixture discharged from the first-stage tubular reactor, a heated storage vessel communicating with the first-stage separator for receiving separated partially nitrated toluene having an average nitrogen content between about 14.5% and about 16.5% by weight and maintaining said partially nitrated toluene above its melting point, an elongated high temperature second-stage tubular reactor having a communicating partially nitrated toluene feed tube and a communicating trinitrating acid feed tube, said feed tubes converging and junctioning with said high temperature second-stage tubular reactor at the intake end thereof, said partially nitrated toluene feed tube communicating with the heated partially nitrated toluene storage vessel and having means associated therewith for feeding a stream of molten partially nitrated toluene under pressure at predetermined flow rate through said partially nitrated toluene feed tube to the high temperature second-stage tubular reactor, said trinitrating acid feed tube communicating with a trinitrating acid supply source and having means associated therewith for feeding a stream of trinitrating acid under pressure at a predetermined flow rate through said trinitrating acid feed tube to the high temperature second-stage tubular reactor, means associated with the high temperature second-stage tubular reactor for maintaining said reactor at a temperature between about 90° C. and about 140° C., an elongated cooling tube communicating at one end thereof with the discharge end of the high temperature second-stage tubular reactor, said cooling tube having means associated therewith for maintaining the temperature of said cooling tube below about 100° C. and above the freezing point of the second-stage reaction mixture, means associated with the high temperature second-stage tubular reactor and cooling tube for maintaining the second-stage reaction mixture therein under sufficient pressure to prevent any substantial vaporization of nitric acid from said reaction mixture, and a second-stage separator disposed to receive the second-stage reaction mixture after cooling thereof for separating trinitrotoluene from spent trinitrating acid.

When it is desired to practice the invention as a continuous cyclic process, the apparatus set forth hereinabove is augmented with a spent trinitrating acid storage vessel communicating with the second-stage separator, an aqueous nitric acid supply source, and an acid mix tank, said spent trinitrating acid storage vessel and said aqueous nitric acid supply source each communicating with said acid mix tank, and said acid mix tank in turn communicating with the first-stage tubular reactor.

Improved apparatus for practicing the first stage of nitration in accordance with this invention comprises in combination an elongated first-stage tubular reactor having a communicating toluene feed tube and a communicating first-stage nitrating acid feed tube, said feed tubes converging and junctioning with said first-stage tubular reactor at one end thereof, said toluene feed tube communicating with a toluene supply source and having means associated therewith for feeding a stream of toluene at predetermined flow rate through said toluene feed tube to the first-stage tubular nitrator, said first-stage nitrating acid feed tube communicating with a first-stage nitrating acid supply source and having means associated therewith for feeding a stream of first-stage nitrating acid at predetermined flow rate through said first-stage nitrating acid feed tube to the first-stage tubular reactor, means associated with the first-stage tubular reactor to control and regulate the temperature of the first-stage reaction mixture therein between about 40° C. and about 140° C., and a first-stage separator disposed to receive the first-stage reaction mixture discharged from the first-stage tubular reactor for separating partially nitrated toluene having an average nitrogen content between about 14.5% and about 16.5% by weight from spent first-stage nitrating acid.

In another embodiment of first-stage nitration apparatus, the toluene feed tube is divided into at least two branches, one branch of which converges with the first-stage nitrating acid feed tube and junctions with the first-stage tubular reactor at the intake end thereof, and at least one branch of which junctions with said tubular reactor at a distance from said intake end. Preferably, the partially nitrated toluene storage vessel is associated with heating means to maintain said partially nitrated toluene above its melting point.

In still another embodiment of first-stage nitration apparatus, there is provided an elongated cooling tube, the intake end of which junctions and communicates with the first-stage tubular reactor near the discharge end thereof and the discharge end of which junctions and communicates with said first-stage tubular reactor adjacent the intake end thereof to cool and recycle part of the first-stage reaction mixture.

Improved apparatus for practicing second-stage nitration in accordance with this invention comprises in combination an elongated second-stage tubular reactor having a communicating partially nitrated toluene feed tube and a communicating trinitrating acid fed tube, said feed tubes converging and junctioning with said second-stage tubular reactor at the intake end thereof, said partially nitrated toluene feed tube communicating with a heated storage vessel containing molten partially nitrated toluene having an average nitrogen content between about 14.5% and about 16.5% by weight, said partially nitrated toluene feed tube having means associated therewith for feeding a stream of said molten partially nitrated toluene under pressure at predetermined flow rate through said partially nitrated toluene feed tube to the high temperature second-stage tubular reactor, said trinitrating acid feed tube communicating with a trinitrating acid supply source and having means associated therewith for feeding a stream of trinitrating acid under pressure at a predetermined flow rate through said trinitrating acid feed tube to the high temperature second-stage tubular reactor, means associated with the high temperature second-stage tubular reactor for maintaining said reactor at a temperature between about 90° C. and about 140° C., an elongated cooling tube communicating at one end thereof with the discharge end of the high temperature second-stage tubular reactor, said cooling tube having means associated therewith for maintaining the temperature of said cooling tube below about 100° C. and above the freezing point of the second-stage reaction mixture, means associated with the high temperature second-stage tubular reactor and cooling tube for maintaining the second-stage reaction mixture therein under sufficient pressure to prevent any substantial vaporization of nitric acid from said reaction mixture, and a second-stage separator disposed to receive the second-stage reaction mixture after suitable cooling thereof for separating trinitrotoluene from spent trinitrating acid.

In one preferred embodiment of the invention, an initial part of the high temperature second-stage tubular reactor adjacent the converging feed tubes is associated with heating means for maintaining said initial part at a temperature between about 90° C. and about 120° C., and the remainder of said second-stage tubular reactor is associated with other heating means for maintaining the temperature of said remainder at a higher temperature than said initial part and between about 110° C. and about 140° C.

A preferred embodiment of the invention has been chosen for purposes of illustration and description and is shown in the accompanying drawing forming a part of the specification, in which reference symbols refer to like parts wherever they occur and in which gauges and other conventional auxiliary equipment have been omitted for simplicity.

FIG. 1 is a digrammatic drawing illustrating the features of this invention.

FIG. 2 is a diagrammatic drawing illustrating divided toluene feed in accordance with one embodiment of this invention.

FIG. 3 is a diagrammatic, fragmentary, cross-sectional view illustrating one embodiment for the junction of tubular feed lines with tubular reactors employed in both first- and second-stage nitrations, as illustrated at A and B in FIG. 1.

FIG. 4 is a diagrammatic drawing illustrating cooling and recycle of part of the first-stage reaction mixture in accordance with another embodiment of this invention.

Referring to the drawing, toluene from supply tank 11 via line 12 is fed through pump 13 in predetermined proportions via valved line 14 to tubular reactor 15. Valve 16 in line 14 is a quick opening by-pass valve which is normally closed. However, upon shutdown for any reason, this valve can be instantly opened to shut off the supply of toluene to the tubular reactor and return the toluene via line 17 to toluene supply tank 11. Simultaneously, the first-stage nitrating acid, containing between about 60% and about 85% sulfuric acid, between about 10% and about 30% nitric acid, and between about 3% and about 16% water by weight on a contaminant free basis, from supply tank 18 is fed via line 19 through pump 21 in predetermined proportions via line 22 to tubular reactor 15.

It will be seen from the drawing that tubular feed lines 14 and 22 converge and junction with tubular reactor 15 at one end thereof, and in the embodiment illustrated in FIG. 1 the two tubular feed lines and the tubular reactor form a simple T-tube section, as illustrated at A in FIG. 1, free of moving parts, as illustrated in FIG. 3. The separate streams of toluene and first-stage nitrating acid thus converge and impinge upon each other to form a reaction mixture stream in tubular reactor 15 at the point where the two tubular feed lines junction with tubular reactor 15.

The reaction mixture stream is then advanced through tubular reactor 15 at a flow rate corresponding to a Reynold's number of at least about 500, and preferably at a flow rate corresponding to a Reynold's number of at least about 2100 and sufficient to maintain turbulent flow in the reaction mixture stream, whereupon toluene reacts with the first-stage nitrating acid to form a partially nitrated toluene having an average nitrogen content between about 14.5% and about 16.5% by weight. The reaction mixture is then discharged from tubular reactor 15 at 23 into separator 24 where partially nitrated toluene is separated from spent first-stage nitrating acid which is drawn off via line 25. Since spent first-stage nitrating acid contains some dissolved partially nitrated toluene having a nitrogen content between about 14.5% and about 16.5% by weight, such spent acid may be subjected to extraction with toluene to recover the partially nitrated toluene therefrom, and the toluene extract thus obtained can then be cycled to the first-stage nitration reaction to nitrate the toluene therein to a product containing 14.5% to 16.5% nitrogen by weight. 26 having inlet 26a and outlet 26b is a conventional cooling bath, as for example, a circulating water bath, surrounding at least part of tubular reactor 15, to control and regulate the temperature of the reaction mixture in tubular reactor 15 at a temperature between about 40° C. and about 140° C.

In a preferred practice of this invention, it has been found desirable to inject water into the first-stage reaction mixture upon substantial completion of the first-stage nitration reaction and prior to separation of the partially nitrated toluene from spent first-stage nitrating acid. Dilution of the the reaction mixture with water enhances recovery of the partially nitrated toluene by reducing its solubility in spent acid. A convenient means for accomplishing such water dilution is illustrated in FIG. 1 by which water via line 28 is injected at 27 into the reaction mixture in tubular reactor 15. An alternate arrangement for water injection is illustrated in FIG. 4.

In one embodiment of the invention, illustrated diagrammatically in FIG. 2, it has been found desirable to introduce the toluene feed at a plurality of points along tubular reactor 15 in order to achieve improved control of the nitration reaction. Accordingly, with reference to FIG. 2, the supply stream of toluene via line 14 is divided and one branch thereof is fed to tubular reactor 15 via line 29, and the remainder of the toluene is fed to tubular reactor 15 via line 31 and is injected into the reaction mixture in tubular reactor 15 at one or more points along tubular reactor 15, as at 32 and at 33.

In another embodiment of the invention, illustrated diagrammatically in FIG. 4, part of the first-stage reaction mixture, upon substantial completion of the first-stage nitration reaction but prior to water injection into the reaction mixture, is recycled via proportioning valve 71, line 72, cooling tube 73, and line 74 and the cooled mixture is injected into the main reaction mixture stream in tubular reactor 15 at 76. 75 having inlet 75a and outlet 75b is a conventional cooling bath surrounding cooling tube 73.

The partially nitrated toluene having an average nitrogen content between about 14.5% and about 16.5%, produced in the above first-stage nitration of toluene in accordance with this invention, upon separation from spent first-stage nitrating acid in separating zone 24 may be withdrawn from the process via line 34 for conventional washing and purification treatment, and may then be employed as an explosive ingredient in high explosive formulas or in other applications which utilize substantially dinitrotoluene or Bi-Oil.

However, when it is desired to prepare trinitrotoluene in accordance with this invention, the partially nitrated toluene from the first-stage nitration is subjected to a second stage of nitration. Accordingly, partially nitrated toluene from separating zone 24, with or without subsequent washing and purification treatment, is conveyed by a line 35 to storage tank 36 which is preferably heated to a temperature above the melting point of the partially nitrated toluene by means of heating coil 77 having inlet 77a and outlet 77b, or by equivalent means.

Partially nitrated toluene having an average nitrogen content between about 14.5% and about 16.5% from heated storage tank 36 is then fed via jacketed line 37, pump 38 and jacketed line 39 in predetermined proportions under pressure and at a temperature above its melting point to high temperature tubular reactor 41. Simultaneously, anhydrous trinitration acid from supply tank 42 via line 43 is fed through pump 44 and jacketed line 45 in predetermined proportions under pressure and at an elevated temperature to high temperature tubular reactor 41.

It will be seen from the drawing that jacketed feed lines 39 and 45 and tubular reactor 41 form a simple T-tube section, as illustrated at B in FIG. 1, free of moving parts, as illustrated in FIG. 3. The separate streams of molten partially nitrated toluene and anhydrous trinitration acid thus converge and impinge upon each other to form preferably a turbulent reaction mixture stream in high temperature tubular reactor 41.

The reaction mixture stream is then continuously advanced under pressure through high temperature tubular reactor 41 at a flow rate corresponding to a Reynold's number of at least about 500, preferably at a flow rate corresponding to a Reynold's number of at least about 2100 and sufficient to maintain turbulent flow in the reaction mixture, whereupon partially nitrated toluene reacts with anhydrous trinitration acid to form trinitrotoluene. 46 having inlet 46a and outlet 46b and 47 having inlet 47a and outlet 47b are conventional heat control means which may be integral or separated, as desired, surrounding high temperature tubular reactor 41 to maintain said reactor at a temperature between about 90° C. and about 140° C.

The reaction mixture containing trinitrotoluene in spent trinitration acid is then continuously advanced under pressure through cooling tube 48 maintained at a temperature below about 100° C. and above the freezing point of the second-stage reaction mixture. 49 having inlet 49a and outlet 49b is a conventional heat exchange means surrounding cooling tube 48.

In one embodiment of this invention, it has been found desirable to inject nitric acid of about 98% $HNO_3$ content into the reaction mixture upon substantial completion of the second-stage nitration reaction and prior to separation of trinitrotoluene from spent trinitrating acid. Such nitric acid injection into the reaction mixture greatly enhances recovery of trinitrotoluene by reducing its solubility in spent trinitrating acid. A convenient means for such nitric acid introduction is illustrated in FIG. 1 by which 98% nitric acid via line 51 is injected at 52 into the reaction mixture in cooling tube 48.

The reaction mixture is then continuously discharged from cooling tube 48 into separator 54 through pressure tube 53 having a smaller inside diameter than cooling tube 48. 53a is a steam jacket surrounding pressure tube 53. Trinitrotoluene is separated from spent trinitrating acid in separating zone 54 and is withdrawn from the process via line 55 for conventional washing and purification treatment. Separated spent trinitrating acid from separating zone 54 is transported via line 56 to storage tank 57 from which it is conveyed via line 58, pump 59 and line 61 to mixed acid storage tank 62. Aqueous nitric acid from supply tank 63 is also conveyed to mixed acid storage tank 62 via line 64, pump 65 and line 66. Spent trinitrating acid and aqueous nitric acid are mixed in predetermined proportions in mixed acid storage tank 62 to adjust the composition of the spent trinitrating acid to contain between about 60% and about 85% sulfuric acid, between about 10% and about 30% nitric acid, and between about 3% and about 16% water by weight on a contaminant free basis, and the adjusted acid composition is then recycled as first-stage nitrating acid via line 67, pump 68 and line 69 to supply tank 18.

In a preferred embodiment of second-stage nitration in accordance with this invention, it has been found desirable to maintain an initial part of high temperature tubular reactor 41 adjacent the intake end which junctions with jacketed feed lines 39 and 45 at a lower temperature than the remainder of high temperature tubular reactor 41, and preferably at a temperature between about 90° C. and about 120° C., the remainder of high temperature tubular reactor 41 being maintained between about 110° C. and about 140° C. This improves control of the reaction. Accordingly, heat control means 46 and heat control means 47 are independent of each other in this embodiment of this invention as indicated by line X in FIG. 1. An isothermal boiling water bath has been found to be convenient and practical as heat control means 46, whereas heat control means 47 can conveniently be an isothermal boiling chlorobenzene bath (132° C.). It will be understood, however, that the invention is not limited in this respect, since obviously other heat control means within the skill of the art can be employed. As an alternative arrangement, heat control means 46 and 47 can be integrated and adjusted to maintain a gradually increasing temperature gradient from about 90° C. at the intake end of reactor 41 adjacent to B to about 140° C. at the discharge end adjacent to cooling tube 48.

Successful practice of this invention in both first-stage and second-stage nitration processes requires means for the positive feed and proportioning of the respective reactant feed streams of toluene and first-stage nitrating acid for first-stage nitration and of partially nitrated toluene and trinitrating acid for second-stage nitration, and any means which will accomplish such positive feed and proportioning is equivalent for the purposes of this invention. For example, metering pumps, gear pumps, centrifugal pumps, pressure exerted by hydraulic head, pressure exerted by gas under constant pressure, pressure accumulators, and the like, in combination with metering devices when necessary or desirable, or any combination of such means can be employed.

In the embodiment illustrated in the drawing, it will be seen that reactant feed lines 14 and 22 junction with tubular reactor 15 to form a simple T-tube section as at A. Similarly, reactant feed lines 39 and 45 junction with tubular reactor 41 to also form a simple T-tube section as at B. However, the invention is not limited to employment of T-tube junctions at A and B since the only requirement is that the respective reactant feed lines in both first-stage and second-stage nitration apparatus converge and junction with the respective tubular reactor in each stage so that the respective reactant streams of toluene and first-stage nitrating acid in first-stage nitration and partially nitrated toluene and anhydrous trinitrating acid in second-stage nitration will impinge upon each other. Accordingly, any geometric configuration of the respective reactant feed lines with their respective tubular reactor which will accomplish the purposes of this invention can be employed, as desired.

It is an important characteristic of this invention that there are no moving parts in either the first-stage or second-stage tubular reactors. Turbulent flow is relied upon for effectuating intimate dispersion of toluene in first-stage nitrating acid in first-stage nitration, and for effectuating intimate dispersion of partially nitrated toluene and anhydrous trinitrating acid in second-stage nitration, and for maintaining the respective reaction mixtures in emulsified form in their respective tubular reactors. The rates of flow of the reactant feed streams of toluene and first-stage nitrating acid in first-stage nitration and of partially nitrated toluene and anhydrous trinitrating acid in second-stage nitration are regulated so that upon impingement upon each other, they preferably form turbulent reaction mixtures in the respective tubular reactors. No further mixing is required. It is a further characteristic in both first-stage nitration and in second-stage nitration according to the present invention that both the first-stage and second-stage reaction mixtures positively and continuously advance through their respective tubular reactors.

The first-stage nitration reaction is highly exothermic, commencing immediately upon mixing the toluene with the first-stage nitrating acid and is very rapid, being substantially complete within a matter of 10 seconds or less under the preferred conditions of the invention, and seldom, if ever, requiring any longer than 60 seconds. First-stage nitrations may be made at temperatures as low as 40° C. and as high as 140° C. Degradative secondary reactions assume undesirable proportions in relation to the desired nitration reaction at temperatures above about 140° C., and such temperatures should, therefore, be avoided. It has been found that the first-stage nitration reaction rate is greatly accelerated with increasing temperature. Accordingly, therefore, the first-stage nitration reaction should preferably be conducted at as high a temperature as possible consistent with the avoidance of undesirable degradative side reactions. In the preferred practice of this invention, it has been found desirable to regulate the temperature of the first-stage reaction mixture within the range between about 60° C. and about 105° C.

In the embodiment illustrated in FIG. 1, a cooling bath 26 is employed as a convenient means for controlling and regulating the temperature of the first-stage reaction mixture stream within the operative temperature range. However, the invention is not limited in this respect, for other means may be employed to regulate and control the temperature of the first-stage reaction mixture. For example, multi-toluene injection, as illustrated in FIG. 2, can be employed either alone or in conjunction with other temperature regulative means, or part of the reaction mixture can be recycled through a cooling coil and the cooled mixture injected into the main reaction mixture, as illustrated in FIG. 4. If desired, either or both of the reactant streams of toluene and first-stage nitrating acid may be chilled prior to introduction to tubular reactor 15. Presently preferred means for temperature control of the first-stage reaction mixture are illustrated in FIGS. 2 and 4. Whereas several alternative means have been disclosed for regulating the temperature of the first-stage reaction mixture between about 40° C. and about 140° C., the invention is by no means limited thereby, for various other expedients for accomplishing such temperature regulation are within the skill of the art. The important feature is regulation and control of the temperature of the first-stage reaction mixture within the limits set forth, and any means or combination of means which will accomplish such regulation and control are equivalent and within the scope of this invention.

It will be apparent from the foregoing description that residence time of the first-stage reaction mixture in the first-stage tubular reaction zone, in accordance with preferred practice of this invention, is of very brief duration, amounting usually to only a few seconds, but should be sufficient to accomplish substantially complete nitration of toluene to an average nitrogen content between about 14.5% and about 16.5%. The length of the first-stage tubular reaction zone to accomplish the purposes of this invention can readily be calculated from desired temperature and flow rate information, and can readily be checked by simple analysis of the partially nitrated toluene product. The inside diameter of the first-stage tubular reactor will be governed largely by the projected production throughput capacity desired from the apparatus, keeping in mind the Reynold's number requirements of the invention.

The second-stage nitration reaction, in which partially nitrated toluene having an average nitrogen content between about 14.5% and about 16.5% is nitrated to trinitrotoluene, is somewhat slower than first-stage nitration, but is nevertheless quite rapid in comparison to prior art methods, being substantially complete within a matter of from about 2 to 6 minutes under the preferred conditions of the invention, and seldom, if ever, requiring longer than about 12 to 15 minutes. Second-stage nitration in accordance with this invention must be carried out in a heated tubular reactor at a temperature above about 90° C. to proceed at all satisfactorily, and reaction rate increases with increasing temperature. However, above about 140° C., degradative side reactions assume undesirable proportions in relation to the desired nitration reaction, and such temperatures should be avoided. The operative temperature range for second-stage nitration in accordance with this invention, therefore, lies between a lower temperature of about 90° C., below which the trinitration reaction does not proceed satisfactorily, and an upper temperature of about 140° C., above which degradative side reactions assume undesirable proportions. Since reaction rate is accelerated with increasing temperature, the second-stage nitration reaction is preferably conducted at as high a temperature as possible, consistent with the avoidance of undesirable degradative side reactions. In the preferred practice of this invention, it has been found desirable to maintain an initial part of the high temperature second-stage tubular reactor adjacent to B at a lower temperature than the remainder of the high temperature second-stage tubular reactor, since, as pointed out hereinbefore, this practice enhances control of the second-stage reaction.

Residence time of the second-stage reaction mixture in the high temperature second-stage tubular reaction zone should be as short as possible in accordance with preferred practice of this invention consistent with substantial completion of the nitration of partially nitrated toluene to trinitrotoluene in order to reduce as far as possible degradative side reactions.

Generally, in accordance with preferred practice of this invention, residence time in the initial lower temperature portion of the high temperature second-stage tubular reaction zone will be on the order of 1–2 minutes, and residence time in the remainder of the high temperature second-stage tubular reaction zone maintained at a higher temperature will be on the order of 2–4 minutes. The length of the second-stage tubular reactor to accomplish the purposes of this invention can be readily calculated from desired temperature and flow rate information, and can be easily checked by simple analysis of the effluent product. The inside diameter of the second-stage tubular reactor will be governed largely by the projected production throughput capacity desired for the apparatus, keeping in mind the Reynold's number requirements of the invention.

Upon completion of the second-stage nitration reaction, the second-stage reaction mixture containing trinitrotoluene in spent trinitrating acid should be cooled to a temperature below about 100° C. in order to inhibit degradative side reactions from taking place to reduce yields of trinitrotoluene, and above the freezing point of the second-stage reaction mixture to prevent plugging the tubular cooling coil. A hot water bath at about 80° C. surrounding tubular cooler 48 has been found to be a convenient means for cooling the second-stage reaction mixture to the degree necessary for the purposes of this invention. However, the invention is not limited to employment of a hot water bath at about 80° C., since numerous other means within the skill of the art can be employed to cool the second-stage reaction mixture to the extent indicated hereinabove as necessary for the purposes of this invention.

It is a characteristic feature in the preferred practice of this invention to maintain the second-stage reaction mixture at a pressure sufficiently high to prevent any substantial evaporation of nitric acid from the second-stage reaction mixture during the second-stage nitration and subsequent cooling of the second-stage reaction mixture. This is conveniently accomplished by passing the second-stage reaction mixture from cooling coil 48 into and through a section of tubing 53 of smaller inside diameter than that of tubular cooler 48 before discharge of the second-stage reaction mixture into second-stage separator 54. Tubing 53 may, if desired, form an extension of restricted inside diameter of cooling tube 48. In the preferred practice of this invention, tubing 53 of restricted inside diameter must be maintained at a temperature above the freezing point of the second-stage reaction mixture. This is conveniently accomplished by enclosing tubing 53 within a steam jacket. This invention is not limited to the use of restricted inside diameter pressure tube, however, since any means within the skill of the art for maintaining the second-stage reaction mixture at sufficient pressure to substantially prevent vaporization of nitric acid therefrom during the second-stage nitration reaction is operative in accordance with this invention. For example, a pressure controller in the line between cooling tube 48 and second-stage separator 54 may be employed if desired.

In practicing second-stage nitration, precaution must be exercised to prevent the partially nitrated toluene having an average nitrogen content between about 14.5% and about 16.5% from freezing. Accordingly, the temperature of the partially nitrated toluene is maintained at a temperature above its melting point by transporting it in liquid form from a heated supply tank through jacketed lines such as 37 and 39 in FIG. 1 heated with hot water, steam, circulated hot air, and the like with or without insulation. Preferably, but not necessarily, the feed stream of trinitrating acid may be preheated to an elevated temperature at least as high as the temperature of the molten partially nitrated toluene feed stream before introducing it to the second-stage tubular reactor at B. This may be conveniently accomplished by passing the trinitrating acid through a jacketed line such as 45 in FIG. 1 heated with hot water, steam, circulated hot air, and the like with or without insulation. This prevents freezing-out of the partially nitrated toluene in the second-stage tubular reactor adjacent to B upon impinging the two feed streams together, and also favors more rapid initiation of second-stage nitration.

According to the present invention, both the first-stage reaction mixture and the second-stage reaction mixture are each advanced through their respective tubular reaction zones at a flow rate corresponding to a Reynold's number of at least about 500, and preferably at a flow rate corresponding to a Reynold's number of at least about 2100 and sufficient to maintain turbulent flow in the respective reaction mixtures. Reynold's number, according to Badger and McCabe, Elements of Chemical Engineering, 1936 ed., page 28, is readily calculated from the following engineering formula:

$$\text{Reynold's number} = \frac{Du\rho}{\mu}$$

In terms metric units $D=$ inside diameter of tube in cm.
$u=$ linear velocity of liquid stream in cm./sec.
$\rho=$ density of liquid in g./cc.
$\mu=$ viscosity of liquid in poises.

At Reynold's number above about 2100, the flow of a liquid in smooth tubes generally assumes a turbulent character. For the purposes of this invention, completely turbulent flow is not necessary, since successful nitrations in both first-stage nitration and in second-stage nitration have been made at Reynold's numbers of approximately 500. However, to keep the reaction time to a minimum and the efficiency of heat transfer at a maximum, it is desirable that the Reynold's number be at least about 2100.

First-stage nitrating acid in accordance with this invention contains between about 60% and about 85% sulfuric acid, between about 10% and about 30% nitric acid, and between about 3% and about 16% water by weight, with or without small percentages of trinitrotoluene and nitration contaminants from second-stage nitration, depending upon whether the first-stage nitrating acid is formulated with fresh nitric and sulfuric acids or is formulated by adjusting the composition of spent trinitrating acid from second-stage nitration with aqueous nitric acid. Between about 4 parts and about 200 parts of first-stage nitrating acid per part of toluene by weight can be employed in practicing this invention, and preferably between about 5 parts and about 25 parts by weight per part of toluene.

Trinitrating acid employed in second-stage nitration to nitrate partially nitrated toluene having an average nitrogen content between about 14.5% and about 16.5% to trinitrotoluene contains between about 60% and about 95% sulfuric acid, between about 5% and about 40% nitric acid, and between about 0% and about 35% free sulfur trioxide, and will be employed to the extent of between about 2 parts and about 25 parts per part of partially nitrated toluene by weight, and preferably between about 2.5 parts and about 5 parts per part of partially nitrated toluene by weight.

The following examples set forth some specific embodiments of the invention. It is to be understood, however, that these examples, while illustrative, are not to be construed as a limitation of the invention.

Example 1

This example illustrates an embodiment of first-stage nitration in which partially nitrated toluene having an average nitrogen content between about 14.5% and about 16.5% was prepared by nitrating toluene with first-stage nitrating acid containing 82.2% sulfuric acid, 14.1% nitric acid, and 3.7% water in a tubular reactor.

The tubular reactor for this example consisted of three coiled sections of 3/16-inch inside diameter stainless steel tubing joined together end to end and totaling 100 feet in length. The first coil section, 40 feet long, adjacent the intake end at which the toluene and nitrating acid feed lines joined the tubular reactor, was insulated. The next coil section, 40 feet long, was jacketed and was maintained at 100°–105° C. by passing steam through the jacket. The final coil section, 20 feet long, adjacent the discharge end of the tubular reactor was immersed in a warm water bath maintained at 50° C. The tubular reactor was joined at the intake end thereof by means of a T-tube section, as at A in FIG. 1, with the nitrating acid and toluene feed lines, each of 3/16-inch inside diameter stainless steel tubing.

A constant nitrogen gas pressure of 115 p.s.i. was impressed on the nitrating acid supply in a blow case to feed the nitrating acid to the tubular reaction zone. An electrically driven metering pump in the toluene feed line fed the toluene to the tubular reaction zone. The reactant feed streams of toluene and nitrating acid were impinged upon each other to form a turbulent reaction mixture stream in the tubular reactor, and toluene reacted with the nitrating acid in the tubular reactor to form partially nitrated toluene having an average nitrogen content between about 14.5% and about 16.5% by weight. The reaction mixture stream was discharged from the tubular reactor into an ice and water drowning bath from which the partially nitrated toluene product was separated and recovered. The recovered partially nitrated toluene was then washed three times with hot water, dried, and the product analyzed. This product was found to be satisfactory as an explosive ingredient in high explosive compositions. It was also found that the recovered partially nitrated toluene product can be readily nitrated to trinitrotoluene with anhydrous trinitrating acid in a second stage of nitration.

Pertinent data relative to the nitration and the recovered product follow:

| | |
|---|---|
| Toluene feed rate _____ g./min__ | 49.6 |
| Nitrating acid feed rate _____ g./min__ | 1148 |
| Feed ratio of nitrating acid to toluene (by weight) _____ | 23.1 |
| Ratio of nitric acid to toluene (by weight) _____ | 3.25 |
| Residence time of reaction mixture in tubular reactor _____ min__ | 0.9 |
| Maximum recorded temperature in reaction mixture _____ ° C__ | 114 |
| Nitrogen content of recovered partially nitrated toluene (by weight) _____ percent__ | 15.7 |
| Setting point of recovered partially nitrated toluene _____ ° C__ | 51 |

Setting point is the temperature at which the product solidifies.

Example 2

This example illustrates another embodiment of first-stage nitration in which partially nitrated toluene having an average nitrogen content between about 14.5% and about 16.5% was prepared by nitrating toluene with a first-stage nitrating acid containing 67.7% sulfuric acid, 27% nitric acid, and 5.3% water in a tubular reactor.

The tubular reactor for this example consisted of a 20-foot coiled section of 3/16-inch diameter stainless steel tubing immersed in a circulating tap water bath. The tubular reactor was joined at the intake end thereof by means of a T-tube section, as at A in FIG. 1, with the nitrating acid and toluene feed lines, each of 3/16-inch diameter stainless steel tubing.

In this embodiment an electrically driven metering pump was employed in both the nitrating acid feed line and in the toluene feed line to feed the respective reactants to the tubular reactor. The reactant feed streams of toluene and nitrating acid were impinged upon each other to form a turbulent reaction mixture stream in the tubular reactor, and toluene reacted with the nitrating acid in the tubular reactor to form partially nitrated toluene having an average nitrogen content between about 14.5% and about 16.5%. The reaction mixture stream was discharged from the tubular reactor into an ice and water drowning bath, from which the partially nitrated toluene product was separated and recovered. The recovered partially nitrated toluene was then washed three times with hot water, dried, and the product analyzed. This product was found to be satisfactory as an explosive ingredient in high explosive compositions. It was also found that the recovered partially nitrated toluene product can be readily nitrated to trinitrotoluene with anhydrous trinitrating acid in a second stage of nitration.

Pertinent data relative to the nitration and the recovered product follow:

| | |
|---|---|
| Toluene feed rate _____ g./min__ | 52 |
| Nitrating acid feed rate _____ g./min__ | 625 |
| Feed ratio of nitrating acid to toluene (by weight) _____ | 12 |
| Ratio of nitric acid to toluene (by weight) _____ | 2.25 |
| Residence time of reaction mixture in tubular reactor _____ min__ | <0.1 |
| Maximum recorded temperature in reaction mixture _____ ° C__ | 97.3 |
| Nitrogen content of recovered partially nitrated toluene (by weight) _____ percent__ | 15.7 |
| Setting point of recovered partially nitrated toluene _____ ° C__ | 53 |

Example 3

This example illustrates three additional embodiments of first-stage nitration in which in each embodiment partially nitrated toluene having an average nitrogen content between about 14.5% and about 16.5% was prepared by nitrating toluene with a first-stage nitrating acid containing 67.7% sulfuric acid, 27% nitric acid, and 5.3% water in a tubular reactor.

The tubular reactor and nitrating acid feed line for these three embodiments were substantially the same as set forth in Example 2. However, in each of the three embodiments illustrated in this example, the main toluene feed stream from a 3/16-inch inside diameter feed line was divided into two approximately equal branches and was injected into the tubular reactor at two points on the tubular reactor as illustrated in FIG. 2. One branch of the toluene feed stream was fed into the tubular reactor at the T-tube junction of the tubular reactor with the nitrating acid feed line, where this branch of the toluene feed stream and the nitrating acid feed stream impinged upon each other to form a turbulent reaction mixture in the tubular reactor. The remainder of the toluene feed stream was injected into the reaction mixture in the tubular reactor at a point on the tubular reactor 9 feet from the initial T-tube junction illustrated at A in FIG. 2. Metering pumps in both the main toluene feed line and in the nitrating acid feed line were employed to feed the respective reactants to the tubular reactor, as in Example 2. In each embodiment toluene reacted with nitrating acid in the tubular reactor to form partially nitrated toluene having an average nitrogen content between about 14.5% and about 16.5%. The partially nitrated toluene product in each embodiment was separated, washed, and recovered substantialy as set forth in Example 2. This product was found to be satisfactory as an explosive ingredient in high explosive compositions.

It was also found that the recovered partially nitrated toluene product can be readily nitrated to trinitrotoluene with anhydrous trinitrating acid in a second stage of nitration.

Pertinent data relative to the three embodiments follow:

|  | Run A | Run B | Run C |
|---|---|---|---|
| Toluene feed rate (g./min.) | 64.8 | 60.6 | 64.8 |
| Nitrating acid feed rate (g./min.) | 752.2 | 552.1 | 489.1 |
| Feed ratio of nitrating acid to toluene (by weight) | 11.6 | 9.1 | 7.5 |
| Ratio of nitric acid to toluene (by weight) | 3.1 | 2.4 | 2 |
| Residence time of reaction mixture in tubular reactor (min.) | <0.1 | <0.1 | <0.1 |
| Maximum recorded temperature in reaction mixture (° C.) | 103 | 98 | 97 |
| Nitrogen content of recovered partially nitrated toluene (percent by weight) | 15.2 | 15.1 | 14.8 |
| Setting point of recovered partially nitrated toluene (° C.) | 55.5 | 55.5 | 55 |

*Example 4*

This example illustrates an embodiment of second-stage nitration in which trinitrotoluene was prepared by nitrating partially nitrated toluene having a nitrogen content of 16.1% with anhydrous trinitrating acid containing 70.7% sulfuric acid, 16% nitric acid, and 13.3% free sulfur trioxide in a high temperature tubular reactor under pressure.

The high temperature tubular reactor employed in this embodiment consisted of two coiled sections of ¼-inch inside diameter stainless steel tubing joined together end to end and totaling 160 feet in length. The first coil section, 40 feet long, adjacent the intake and at which the partially nitrated toluene and anhydrous nitrating acid feed lines joined the high temperature tubular reactor, was immersed in a boiling water bath (100° C.). The second coil section, 120 feet long, was immersed in a boiling chlorobenzene bath (132° C.). The discharge end of the second coil section of the high temperature tubular reactor was joined to a cooling coil 40 feet long of ³⁄₁₆-inch inside diameter stainless steel tubing immersed in a circulating 80° C. water bath. The discharge end of the 40-foot cooling coil in turn was joined to a 7-foot length of steam jacketed stainless steel pressure tubing having an inside diameter of ¹⁄₁₆ inch, which was discharged into an ice and water drowning bath. The high temperature tubular reactor was joined at the intake end thereof by means of a T-tube section, as at B in FIG. 1, with the anhydrous trinitrating acid and partially nitrated toluene feed lines, each of ¼-inch inside diameter steam jacketed (100° C.) stainless steel tubing.

A constant nitrogen gas pressure of 150 p.s.i.g. was impressed on the anhydrous trinitrating acid supply in a blow case to feed the nitrating acid under pressure continuously to the high temperature tubular reactor. A metering pump in the partially nitrated toluene feed line fed the molten partially nitrated toluene under pressure continuously to the high temperature tubular reactor. The reactant feed streams of anhydrous trinitrating acid and molten partially nitrated toluene were impinged upon each other to form a turbulent reaction mixture stream under pressure in the high temperature tubular reactor, and the resultant reaction mixture stream was continuously advanced through the 40-foot isothermal coil at 100° C., thence through the 120-foot isothermal coil at 132° C., during which passage through the two coiled sections of the high temperature tubular reactor, the partially nitrated toluene reacted with the anhydrous trinitrating acid in the high temperature tubular reactor to form trinitrotoluene. The reaction mixture stream was then continuously advanced through the 40-foot cooling coil at 80° C., thence through the 7-foot length of steam jacket pressure tubing, and was continuously discharged therefrom into an ice and water drowning bath, from which trinitrotoluene was separated and recovered. The recovered trinitrotoluene was then washed three times with boiling water, cooled, dried, and the product was analyzed.

Pertinent data relative to the nitration and recovered product follow:

Partially nitrated toluene feed rate _____g./min__ 101.2
Anhydrous trinitrating acid feed rate ___g./min__ 247.4
Feed ratio of anhydrous trinitrating acid to partially nitrated toluene (by weight) _____ 2.44
Ratio of nitric acid to partially nitrated toluene (by weight) _____ 0.39
Residence time of reaction mixture in high temperature tubular reactor _____min__ 4.3
Nitrogen content of recovered trinitrotoluene (by weight) _____percent__ 18
Setting point of recovered trinitrotoluene ___° C__ 67

*Example 5*

This example illustrates two additional embodiments of second-stage nitration in which in each embodiment trinitrotoluene was prepared by nitrating a partially nitrated toluene with an anhydrous trinitrating acid in a high temperature tubular reactor under pressure. The anhydrous trinitrating acid and the partially nitrated toluene employed in both embodiments were the same as employed in Example 4. The apparatus and procedure were also substantially the same as set forth in Example 4 except that a 20-foot coiled length of steam jacketed stainless steel pressure tubing having an inside diameter of ¹⁄₁₆ inch was employed in the two embodiments of this example instead of the 7-foot length employed in Example 4.

Pertinent data relative to the two embodiments of this example follow:

|  | 5a | 5b |
|---|---|---|
| Partially nitrated toluene feed rate (g./min.) | 43.9 | 74.3 |
| Anhydrous trinitrating acid feed rate (g./min.) | 270 | 219 |
| Feed ratio of anhydrous trinitrating acid to partially nitrated toluene (by weight) | 6.15 | 2.95 |
| Ratio of nitric acid to partially nitrated toluene (by weight) | 0.98 | 0.47 |
| Residence time of reaction mixture in high temperature tubular reactor (min.) | 5 | 5.2 |
| Nitrogen content of recovered trinitrotoluene (percent by weight) | 18.5 | 18.5 |
| Setting point of recovered trinitrotoluene (° C.) | 77 | 74 |

*Example 6*

This example illustrates two additional embodiments of second-stage nitration in which in each embodiment trinitrotoluene was prepared by nitrating a partially nitrated toluene with an anhydrous trinitrating acid in a high temperature tubular reactor under pressure. The trinitrating acid employed in both embodiments was the same as employed in Example 4. The partially nitrated toluene employed in embodiment 6a of this example had an average nitrogen content of 16.1%, whereas the partially nitrated toluene employed in embodiment 6b of this example had an average nitrogen content of 15.2%. The apparatus and procedure employed in the embodiments of this example were the same as set forth in Example 5 with the following exceptions: (1) a metering pump was employed in the embodiments of this example to continuously feed the anhydrous trinitrating acid to the high temperature tubular reactor instead of a nitrogen gas pressured blow case as in Example 5; (2) the 120-foot coil section of the high temperature tubular reactor for the embodiments of this example was immersed in a constant boiling mixture of water and chlorobenzene boiling at 118° C. instead of in a boiling chlorobenzene bath boiling at 132° C. as in Example 5; (3) the reaction mixture stream in the embodiments of this example was discharged from the steam jacketed ¹⁄₁₆-inch inside diameter pressure tubing into a steam jacketed separatory funnel instead of into an ice and water drowning bath as in Example 5, and the trinitrotoluene was continuously separated in molten form from spent trinitrating acid, washed three times with boiling water, chilled, dried, and analyzed. The spent trinitrating acid was drawn off and recovered.

Pertinent data relative to the two embodiments of this example follow:

|  | 6a | 6b |
| --- | --- | --- |
| Partially nitrated toluene feed rate (g./min.) | 26.6 | 46.2 |
| Anhydrous trinitrating acid feed rate (g./min.) | 77.4 | 220.5 |
| Feed ratio of anhydrous trinitrating acid to partially nitrated toluene (by weight) | 2.91 | 4.78 |
| Ratio of nitric acid to partially nitrated toluene (by weight) | 0.47 | 0.77 |
| Residence time of reaction mixture in high temperature tubular reactor (min.) | 12.5 | 5.4 |
| Nitrogen content of recovered trinitrotoluene (percent by weight) | 18.4 | 18.5 |
| Setting point of recovered trinitrotoluene (° C.) | 72 | 70 |

*Example 7*

This example illustrates an embodiment of the invention in which toluene was nitrated by a continuous cyclic process in two stages to form trinitrotoluene. In the first stage of nitration of this embodiment, toluene was continuously nitrated to a partially nitrated toluene having an average nitrogen content of 15.2% with a first-stage nitrating acid containing 67.7% sulfuric acid, 27% nitric acid, and 5.3% water by weight in a tubular reactor. The product from the first stage of nitration was then further continuously nitrated with an anhydrous trinitrating acid containing 70.7% sulfuric acid, 16% nitric acid, and 13.3% free sulfur trioxide to trinitrotoluene in a second stage of nitration in a high temperature tubular reactor under pressure, and spent trinitrating acid was adjusted in composition with an aqueous nitric acid to form first-stage nitrating acid which was recycled to the first-stage nitration reaction.

For the first stage of nitration the tubular reactor consisted of a coiled section of ³⁄₁₆-inch inside diameter stainless steel tubing 20 feet in length immersed in a circulating tap water bath, and a divided toluene feed line was employed. One branch of the toluene feed line and the first-stage nitrating acid feed line joined the tubular reactor at the intake end thereof in a T-tube section, and the remaining branch of the toluene feed line joined the tubular reactor 9 feet from the T-tube junction, as illustrated in FIG. 2. The first-stage nitrating acid and the toluene feed lines were ³⁄₁₆-inch inside diameter stainless steel tubing, and metering pumps were employed in both the nitrating acid and toluene feed lines to meter the reactants to the tubular reactor. Water from line 28 was injected into the reaction mixture at 27 following substantial completion of the first-stage nitration reaction but before separation of the partially nitrated product from spent first-stage nitrating acid, as illustrated in FIG. 1. The reaction mixture from the first-stage tubular reactor was discharged into a jacketed separatory funnel with water at about 60° C. circulating through the jacket. Partially nitrated toluene was continuously separated from first-stage spent nitrating acid in the heated separatory funnel and was piped in molten state to a heated storage tank, from which it was fed in predetermined proportions in molten state through a steam jacketed line to the high temperature tubular reactor employed in second-stage nitration.

For the second stage of nitration the high temperature tubular reactor consisted of two coiled sections of ⅜-inch inside diameter stainless steel tubing joined together end to end and totaling 160 feet in length. The first coil section, 40 feet long, adjacent the intake end at which the partially nitrated toluene and anhydrous trinitrating acid feed lines joined the high temperature tubular reactor, was immersed in a boiling water bath (100° C.). The second coil section, 120 feet long, was immersed in a boiling chlorobenzene bath (132° C.). The discharge end of the second coil section of the high temperature tubular reactor was joined to a cooling coil, 40 feet long, of ¼-inch inside diameter stainless steel tubing immersed in a circulating 80° C. water bath. The discharge end of the 40-foot cooling coil in turn was joined to a 20-foot coiled length of steam jacketed stainless steel pressure tubing having an inside diameter of ⅛ inch. The high temperature tubular reactor was joined at the intake end thereof by means of a T-tube section, as at B in FIG. 1, with anhydrous trinitrating acid and partially nitrated toluene feed lines, each of ⅜-inch inside diameter steam jacketed stainless steel tubing. Metering pumps were employed in both the anhydrous trinitrating acid feed line and in the partially nitrated toluene feed line to feed the respective reactants to the high temperature tubular reactor. The second-stage reaction mixture was discharged from the steam jacketed ⅛-inch inside diameter pressure tubing into a steam jacketed separatory funnel where trinitrotoluene was continuously separated in molten form from spent trinitrating acid, washed three times with boiling water, chilled, dried, and recovered for use. Spent trinitrating acid from the separatory funnel was piped to a spent trinitrating acid storage tank. Part of the spent trinitrating acid from the storage tank was piped to a mixing tank where it was adjusted in composition by adding aqueous nitric acid thereto to reconstitute first-stage nitrating acid which was then recycled to the first-stage nitration.

In carrying out this example, first-stage nitrating acid from a supply tank was continuously pumped to the tubular reactor at the rate of 752.2 g./min. Simultaneously, toluene from a supply tank was continuously pumped to the tubular reactor at a total rate of 64.8 g./min. in a divided stream. The feed ratio of first-stage nitrating acid to toluene by weight was 11.6. The ratio of nitric acid to toluene by weight was 3.2. One branch of the toluene feed stream was fed into the first-stage tubular reactor at the T-tube junction of the first-stage tubular reactor with the first-stage nitrating acid feed line, where this branch of the toluene feed stream and the first-stage nitrating acid feed stream impinged upon each other to form a turbulent reaction mixture stream in the first-stage tubular reactor. The remainder of the divided toluene feed stream was continuously injected into the reaction mixture stream in the first-stage tubular reactor at a point on the tubular reactor 9 feet from the initial T-tube junction. The reaction mixture stream was continuously advanced through the tubular reactor, during which advancement the toluene reacted with the first-stage nitrating acid in the first-stage tubular reactor to form a partial nitrated toluene having an average nitrogen content of 15.2% by weight, and the maximum temperature in the reaction mixture during nitration was 103° C. Upon substantial completion of the nitration reaction, but before discharging the reaction mixture from the first-stage tubular reactor, water from line 28 was injected into the reaction mixture at 27 at the rate of 28.1 g./min. Residence time of the reaction mixture in the first-stage tubular reactor was about 8 seconds.

The first-stage reaction mixture was then continuously discharged at the rate of 845.1 g./min. into a jacketed separatory funnel having hot water at about 70° C. circulating through the jacket. Partially nitrated toluene having an average nitrogen content of 15.2% and a setting point of 55.5° C. was continuously separated from spent first-stage nitrating acid in the heated separatory funnel and was conveyed in molten state at the rate of 125.6 g./min. to a storage tank heated to about 70° C. Separated spent first-stage nitrating acid from the heated separatory funnel was withdrawn from the process.

Partially nitrated toluene from the heated storage tank was continuously pumped at the rate of 125.6 g./min. under pressure in molten state through a steam jacketed line to the second-stage high temperature tubular reactor. Simultaneously and continuously, anhydrous trinitrating acid was pumped at the rate of 600 g./min. under pressure through a second steam jacketed line to the second-stage high temperature tubular reaction. The feed ratio of anhydrous trinitrating acid to partially nitrated toluene was 4.78, and the ratio nitric acid to partially nitrated toluene was 0.77. The two reactant feed streams impinged upon each other at the point where the two reactant feed lines joined the high temperature tubular reactor at B in FIG. 1 to form a turbulent second-stage reaction mixture stream in the high temperature tubular reactor, and the reaction mixture stream then was continuously advanced under pressure through the 40-foot coil immersed in boiling water, thence through the 120-foot coil immersed in boiling chlorobenzene, thence through the 40-foot cooling coil immersed in the circulating water bath at 80° C., and finally through the 20-foot section of steam jacketed pressure tubing, and was continuously discharged at the rate of 725.6 g./min. from the pressure tubing into a steam jacketed separatory funnel. Residence time of the second-stage reaction mixture in the high temperature tubular reactor consisting of the 100° C. isothermal 40-foot coil and the 132° C. isothermal 120-foot coil was approximately 5 minutes, during which partially nitrated toluene reacted with trinitrating acid to form trinitrotoluene.

Molten trinitrotoluene was continuously separated from spent trinitrating acid in the steam jacketed separatory funnel and was drawn off, washed three times with boiling water, crystallized, dried, and withdrawn from the process. The yield of trinitrotoluene was approximately 141 g./min., having a nitrogen content of 18.5% by weight and a setting point of 70° C.

Separated spent nitrating acid from the separatory funnel containing 83.4% sulfuric acid, 9.3% nitric acid, and 7.3% sulfur trioxide, was conveyed at the rate of 569.1 g./min. to a storage vessel. 552 g./min. of this spent trinitrating acid was pumped from the storage vessel to a mixing tank where it was mixed with 200.2 g./min. of aqueous nitric acid containing 75.6% nitric acid and 24.4% water to form 752.2 g./min. of first-stage nitrating acid containing 67.7% sulfuric acid, 27% nitric acid, and 5.3% water which was recycled to the first-stage nitration.

It is apparent from the foregoing description that this invention provides novel and improved apparatus and procedures for the nitration of toluene in stages having many advantages over prior art methods and apparatus for this purpose. The present invention provides apparatus and procedures which are unique in their simplicity, economy, chemical efficiency, and time-saving characteristics in relation to prior art methods and apparatus. Moreover, the present invention provides flexibility in separation of spent nitrating acid from the nitrated toluene product in both first and second stages of nitration, since such separation can be accomplished either by gravity separation or by centrifugal separation. Furthermore, the present invention provides improved ease of temperature control, provides positive metering of reactants, the opportunity for multi-injection of toluene in first-stage nitration, the opportunity for cooling and recycling part of the first-stage reaction mixture, the opportunity to conduct second-stage nitration under pressure to prevent vaporization, and the opportunity to inject water or nitric acid at suitable points into the reaction mixtures to decrease solubility of the desired product in the reaction mixtures, none of which are provided by prior art methods and apparatus. Other important advantages of the present invention reside in the attainment of the objectives as set forth hereinabove.

This application is a division of our copending application for United States Letters Patent Serial No. 642,147, filed February 25, 1957, now U.S. Patent No. 2,951,877, issued September 6, 1960.

What we claim and desire to protect by Letters Patent is:

1. The process in accordance with claim 6 in which the reaction mixture stream is regulated between about 60° C. and about 105° C. during the nitration reaction.

2. The process in accordance with claim 6 in which the reaction mixture stream is advanced through the tubular reaction zone at a flow rate corresponding to a Reynold's number of at least 2100 and sufficient to maintain turbulent flow in said reaction mixture stream.

3. The process in accordance with claim 6 in which water is injected into the reaction mixture stream upon substantial completion of the nitration reaction and prior to separation of partially nitrated toluene from spent nitrating acid.

4. The process in accordance with claim 6 in which partially nitrated toluene is separated from spent nitrating acid by gravity.

5. The process in accordance with claim 6 in which partially nitrated toluene is centrifugally separated from spent nitrating acid.

6. A process for nitration of toluene to an average nitrogen content between about 14.5% and about 16.5% which comprises continuously force feeding a stream of toluene through a divided tubular path to an elongated tubular liquid phase reaction zone, simultaneously and continuously force feeding a stream of nitrating acid containing between about 60% and about 85% sulfuric acid, between about 10% and about 30% nitric acid, and between about 3% and about 16% water by weight through a second tubular path to said elongated tubular liquid phase reaction zone, bringing the separate force-fed streams of nitrating acid and one branch of the divided stream of toluene together so that said streams impinge upon each other from opposing directions at sufficient flow rates to form a turbulent liquid reaction mixture in the elongated tubular liquid phase reaction zone, the impingement of said force-fed streams upon each other from opposing directions being the sole means for mixing the nitrating acid with the toluene in the said one branch of the divided stream of toluene, thereafter injecting the remainder of the divided stream of toluene into the liquid reaction mixture stream in the elongated tubular liquid phase reaction zone, continuously advancing the liquid reaction mixture through the elongated tubular liquid phase reaction zone at a flow rate corresponding to a Reynold's number of at least about 500 while regulating the temperature of said liquid reaction mixture between about 40° C. and about 140° C. and the residence time of said liquid reaction mixture in said elongated tubular liquid phase reaction zone between about 0.1 minute and about 1 minute to nitrate substantially all of the toluene to an average nitrogen content between about 14.5% and about 16.5%, and thereafter separating the nitrated toluene product from spent nitrating acid.

References Cited in the file of this patent

UNITED STATES PATENTS

| | | |
|---|---|---|
| 449,687 | Maxim | Apr. 7, 1891 |
| 2,012,985 | Castner | Sept. 3, 1955 |
| 2,737,522 | Nilsson | Mar. 6, 1956 |
| 2,934,571 | Bonetti | Apr. 26, 1960 |
| 2,947,791 | Adams | Aug. 2, 1961 |